United States Patent
Chen et al.

(10) Patent No.: US 10,578,482 B2
(45) Date of Patent: Mar. 3, 2020

(54) PROXIMITY SENSING DEVICE AND LIGHT GUIDING METHOD THEREOF

(71) Applicant: PixArt Imaging Incorporation, HsinChu (TW)

(72) Inventors: Hui-Hsuan Chen, Hsinchu (TW); Nien-Tse Chen, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 266 days.

(21) Appl. No.: 15/458,941

(22) Filed: Mar. 14, 2017

(65) Prior Publication Data
US 2017/0184446 A1    Jun. 29, 2017

Related U.S. Application Data

(63) Continuation-in-part of application No. 15/226,599, filed on Aug. 2, 2016, which is a continuation of application No. 14/061,709, filed on Oct. 23, 2013, now Pat. No. 9,435,886.

(51) Int. Cl.

| | |
|---|---|
| *G01V 8/00* | (2006.01) |
| *G01J 1/02* | (2006.01) |
| *G01J 1/04* | (2006.01) |
| *G02B 27/14* | (2006.01) |
| *G01S 7/481* | (2006.01) |
| *G01S 7/499* | (2006.01) |
| *G01S 17/02* | (2020.01) |

(52) U.S. Cl.
CPC ........... *G01J 1/0204* (2013.01); *G01J 1/0233* (2013.01); *G01J 1/0414* (2013.01); *G01J 1/0466* (2013.01); *G01J 1/0488* (2013.01); *G01S 7/4811* (2013.01); *G01S 7/4813* (2013.01); *G01S 7/499* (2013.01); *G01S 17/026* (2013.01); *G02B 27/144* (2013.01); *Y10T 29/49016* (2015.01)

(58) Field of Classification Search
CPC ...... G01J 1/0204; G01J 1/0466; G01J 1/0414; G01J 1/0233; G01J 1/0488; G02B 27/144; G01S 17/026; G01S 7/4811; G01S 7/4813; G01S 7/499
USPC .............................. 250/559.38, 499, 559.29
See application file for complete search history.

(56) References Cited

U.S. PATENT DOCUMENTS

| | | | | |
|---|---|---|---|---|
| 9,519,110 | B2 * | 12/2016 | Hugler | ............... G01D 5/34723 |
| 2006/0060762 | A1 * | 3/2006 | Chan | ..................... H04M 1/605 |
| | | | | 250/221 |
| 2006/0061705 | A1 * | 3/2006 | Onishi | ................. G02B 6/0046 |
| | | | | 349/62 |
| 2009/0128781 | A1 * | 5/2009 | Li | ........................ G02B 6/0008 |
| | | | | 353/20 |
| 2010/0073518 | A1 * | 3/2010 | Yeh | ........................ H04N 5/217 |
| | | | | 348/231.99 |

(Continued)

*Primary Examiner* — Georgia Y Epps
(74) *Attorney, Agent, or Firm* — Tung & Associates

(57) ABSTRACT

A proximity sensing device includes: a light source, a sensing unit, a light guide unit, and a window. The light source emits light, which is guided by the light guide unit to the window. The emitted light reflected by an object is received by the same window. The light guide unit includes a partial-transmissive-partial-reflective (PTPR) optical element, whereby the light emitted from the light source is reflected by the PTPR optical element, while the light reflected by the object passes through the PTPR optical element. There is only one window required.

5 Claims, 5 Drawing Sheets

(56) References Cited

U.S. PATENT DOCUMENTS

| | | | |
|---|---|---|---|
| 2010/0253931 A1* | 10/2010 | Meier | G01B 11/002 356/4.01 |
| 2012/0037794 A1* | 2/2012 | Lee | G01S 17/026 250/216 |
| 2012/0212453 A1* | 8/2012 | Huang | G06F 3/0421 345/175 |
| 2013/0048837 A1* | 2/2013 | Pope | G01J 1/0422 250/214.1 |
| 2015/0077758 A1* | 3/2015 | Luthi | G01S 17/36 356/482 |

* cited by examiner

PROXIMITY SENSING DEVICE AND LIGHT GUIDING METHOD THEREOF

CROSS REFERENCE

The present invention is a continuation-in-part application of U.S. Ser. No. 15/226,599, filed on Aug. 2, 2016, which is a divisional application of U.S. Ser. No. 14/061,709, filed on Oct. 23, 2013.

BACKGROUND OF THE INVENTION

Field of Invention

The present invention relates to a proximity sensing device, especially a proximity sensor including a light guide unit which includes a partial-transmissive-partial-reflective (PTPR) optical element such that light emitted from a light source and light reflected from an object pass through the same window to reduce the area required for the window.

Description of Related Art

Proximity sensing devices are commonly employed in current handheld devices. On the housing of the handheld device, a conventional proximity sensing device requires two separate windows, one for emitting a light beam to outside of the device and the other for receiving light reflected from an outside object. In some design the two separate windows are shown to be one slot-shaped area on the outer appearance of the handheld device, but actually it includes two separate light passages. The total size of the two separate windows or the slot-shaped area is about 2.2-4 mm in its longer dimension. Apparently, this is disadvantageous in terms of minimizing the size providing flexibility in appearance design of a handheld device.

SUMMARY OF THE INVENTION

In one perspective, the present invention provides a proximity sensing device, which includes: a light source, configured to operably emit a light beam for sensing a proximal status of an object; a sensing unit, configured to operably receive light reflected from the object, for determining the proximal status of the object; a light guide unit which includes a partial-transmissive-partial-reflective (PTPR) optical element, the PTPR optical element being configured to reflect at least part of the light beam emitted by the light source and transmit at least part of the light reflected from the object; and a window located between the light guide unit and the object, the same window being configured to pass the light reflected by the light guide unit to the object and pass the light reflected from the object to the light guide unit.

In one embodiment, the light source and the sensing unit are located on a same substrate, and the light guide unit further includes a reflective optical element configured to reflect the light beam emitted by the light source to the PTPR optical element, whereby the light beam emitted by the light source is first reflected by the reflective optical element, next reflected by the PTPR optical element, and further next passing through the window.

In one embodiment, a size of the window is not larger than 1 mm×1 mm.

In one embodiment, the proximity sensing device is located in a handheld device, which includes a transparent cover for covering the proximity sensing device, wherein the transparent cover includes an IR-ink (infrared ink) located at a location corresponding to the window.

In one embodiment, the PTPR optical element includes a transparent body and a semi-reflective surface on the transparent body.

In one embodiment, the semi-reflective surface includes a polarization coating.

In another perspective, the present invention provides a light guiding method of proximity sensing device, which includes steps of: emitting a light beam from inside a handheld device; reflecting the light beam, by a partial-transmissive-partial-reflective (PTPR) optical element, to a window formed on the handheld device; receiving light from the same window; and guiding the received light to pass through the PTPR optical element, to a sensing device.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, o show the interrelations between the components, but not drawn according to actual scale.

Figure 1:
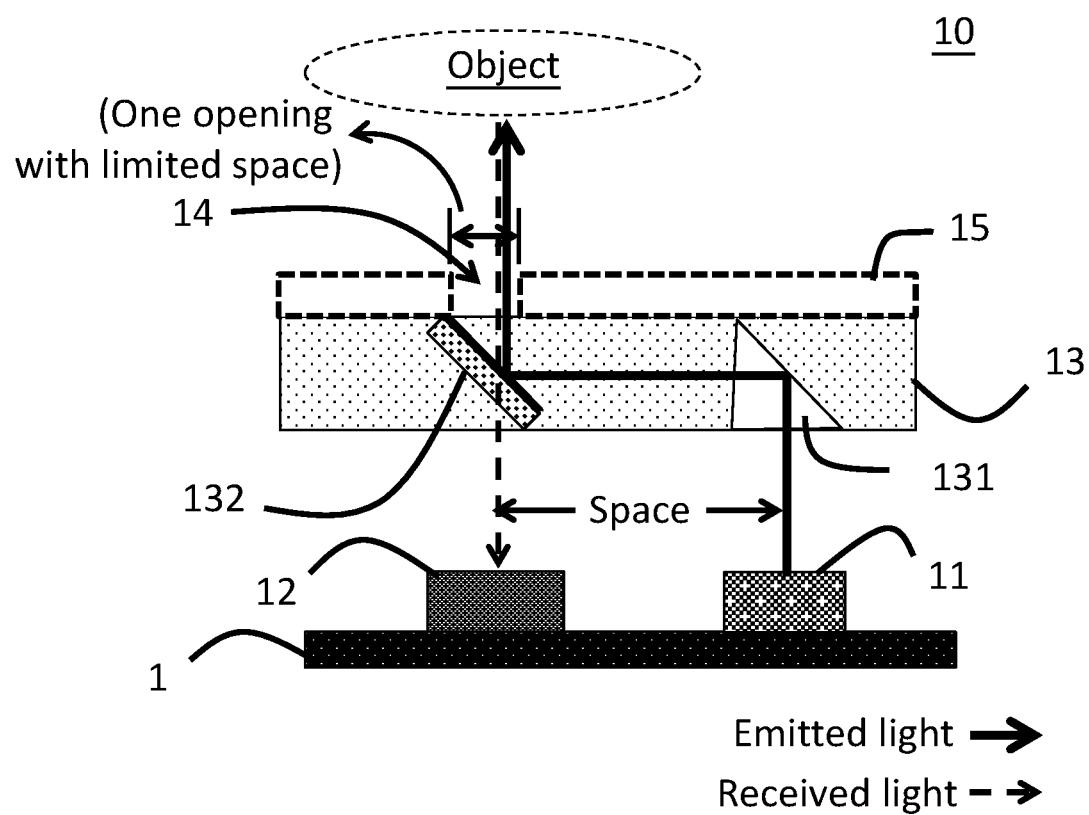
FIG. 1 shows a proximity sensing device according to one embodiment of the present invention.

FIG. 1 shows a proximity sensing device 10 according to one embodiment of the present invention, for sensing a proximal status. The proximity sensing device 10 includes: a light source 11, a sensing unit 12, and a light guide unit 13. The proximity sensing device 10 emits and receives light through a same window 14. The window 14 can be regarded a part of the proximity sensing device 10, or if the proximity sensing device 10 is employed in a handheld device, the window 14 for example can be located on a housing of the handheld device.

The light source 11 and the sensing unit 12 are preferably located on a same substrate 1. The light source 11 is configured to operably provide a light beam, for sensing a proximal status of an object (which is equivalent to sensing a proximal status of the proximity sensing device 10 to the object). The sensing unit 12 is configured to operably receive light reflected from the object, for determining the proximal status of the object. The light guide unit 13 guides the light beam emitted from the light source 11 to the window 14, and also guides the light received from the same window 14 to the sensing unit 12.

In one preferable embodiment, the light guide unit 13 includes a partial-transmissive-partial-reflective (PTPR) optical element 132, which is configured to reflect at least part of the light beam emitted by the light source and transmit at least part of the light reflected from the object, whereby at least part of the light beam emitted by the light source reaches the window and at least part of the light received from the window 14 reaches the sensing unit 12.

Figure 2:
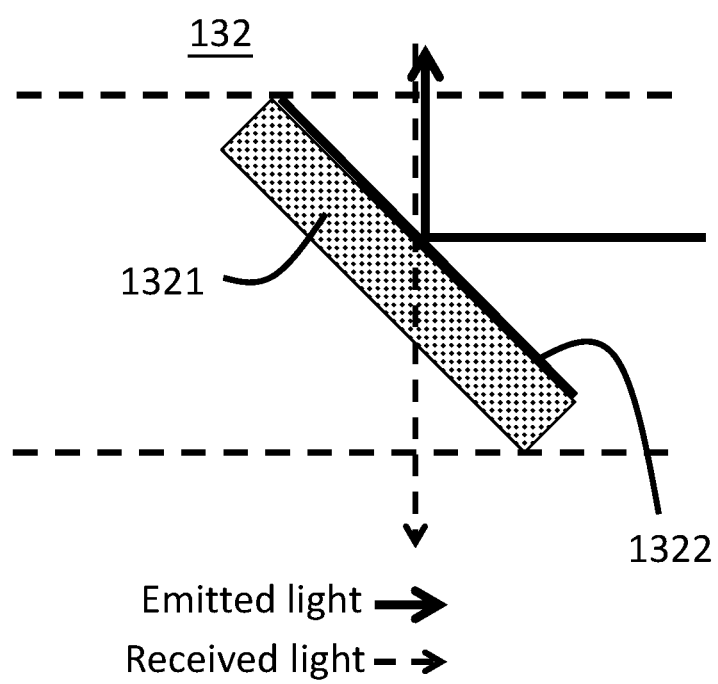
FIG. 2 shows a PTPR optical element according to one embodiment of the present invention.

Referring to FIG. 2, in one embodiment, the PTPR optical element 132 includes a transparent body 1321 and a semi-reflective surface 1322 located on the transparent body 1321. The semi-reflective surface 1322, in one embodiment, includes a polarization coating. The light beam from the light source 11 includes an s-polarized component and a p-polarized component. The polarization coating can reflect a certain portion of one of the s-polarized component and p-polarized component, while it let a certain portion of the other of the s-polarized component and p-polarized component pass by. For example, the light source 11 can emit light having a higher ratio of s-polarized component to p-polarized component, and the polarization coating is designed to reflect the s-polarized component but let go of the p-polarized component. The light reflected by the object will not only include the emitted light but also some stray light, so if the object is close, there will be a significant amount of p-polarized component passing through the window 14, through the polarization coating and the transparent body 1321, to the sensing unit 12, as shown by the "received light" path.

Referring back to FIG. 1, in one embodiment, the light guide unit 13 further includes a reflective optical element 131, which is configured to reflect the light beam emitted by the light source 11 to the PTPR optical element 132, whereby the light beam emitted by the light source 11 is first reflected by the reflective optical element 131, next reflected by the PTPR optical element 132, and further next passing through the window 14.

The purpose to provide the reflective optical element 131 is to redirect the light emitting direction, so that the light source 11 and the sensing unit 12 can be located on the same substrate 1, facing the same direction. This helps to reduce the thickness of the proximity sensing device 10.

As per the reflective optical element 131, in one embodiment, the reflective optical element 131 can be a prism lens. In another embodiment, the reflective optical element 131 can be a mirror.

Referring to FIG. 1, in one embodiment, the proximity sensing device 10 itself may have an enclosure or cover 15, or when the proximity sensing device 10 is employed in a handheld device, the handheld device may have a housing 15. In one embodiment, the window 14 can be an opening in the enclosure or cover or housing 15.

Figure 3A:
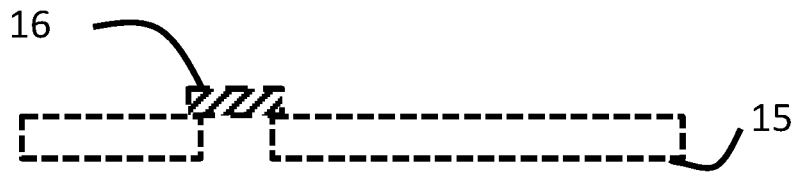
FIGS. 3A-3D show several embodiments of the enclosure, cover or housing, and the window.
Figure 3B:
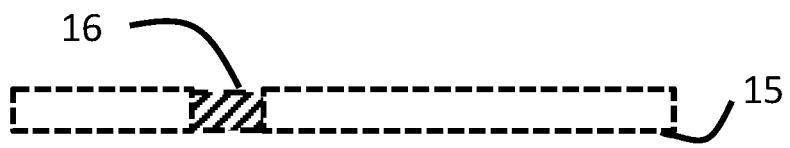
Figure 3C:
Figure 3D:

FIGS. 3A-3D show several other embodiments. In FIG. 3A, the enclosure or cover or housing 15 is cover by a coating 16, at a location corresponding to the window. The coating 16 for example can be, but is not limited to, a transparent coating, an IR-ink (infrared ink), or a coating capable of filtering a desired wavelength range. In FIG. 3B, the coating 16 is inside the window. In FIG. 3C, another cover plate 17 is provided on the enclosure or cover or housing 15, and the cover plate 17 for example can be made of a substantially transparent material, or a material which is capable of filtering a desired wavelength range. The coating 16 is on the enclosure or cover or housing 15, while in the cover plate 17. In FIG. 3D, the coating 16 is inside the window.

Figure 4:
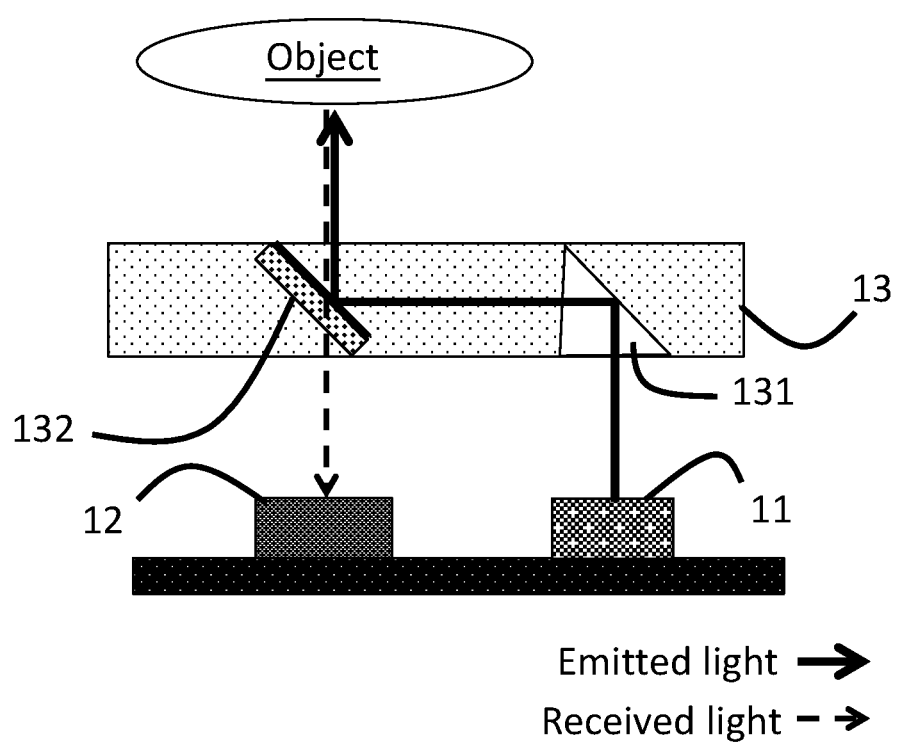
FIG. 4 shows light paths for better comprehension.

FIG. 4 shows the light paths for emitting light outward and receiving light inward. Because only one window is required for both the outward light path and the inward light path, the size of the area occupied by the window is reduced. In one embodiment, the size of the window is not larger than 1 mm×1 mm.

Figure 5:
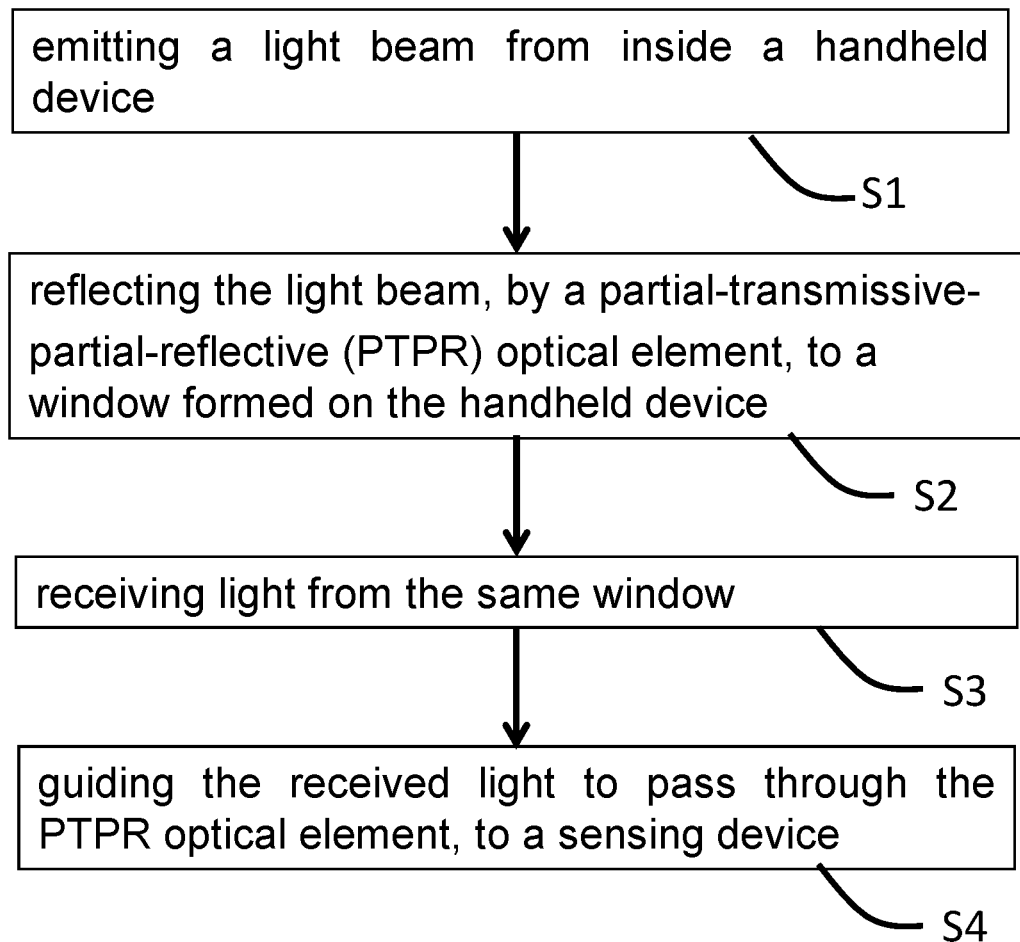
FIG. 5 shows a light guiding method of proximity sensing device according to one embodiment of the present invention

In one perspective, the present invention also provides a light guiding method of proximity sensing device. Pease refer to FIG. 5, wherein the light guiding method includes: emitting a light beam from inside a handheld device (S1); reflecting the light beam, by a PTPR optical element, to a window formed on the handheld device (S2); receiving light from the same window (S3); and guiding the received light to pass through the PTPR optical element, to a sensing device (S4).

Note that, for illustration purpose, both the emitted light beam and the received light are represented by straight lines. However, according to natural optical physics, the emitted light beam and the received light in fact have light intensity distributions, and the drawings simplify it. Therefore, in the context of the present invention, "light beam" or "light" does not require to be its complete intensity distribution, but can be any significant portion thereof.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. Besides, an embodiment or a claim of the present invention does not need to attain or include all the objectives, advantages or features described in the above. The abstract and the title are provided for assisting searches and not to be read as limitations to the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment.

What is claimed is:

1. A proximity sensing device, comprising:
   a light source, configured to operably emit a light beam for sensing a proximal status of an object;
   a sensing unit, configured to operably receive light reflected from the object, for determining the proximal status of the object;
   a light guide unit which includes a partial-transmissive-partial-reflective (PTPR) optical element, the PTPR optical element being configured to reflect at least part of the light beam emitted by the light source and transmit at least part of the light reflected from the object, such that a light emitting path of the light beam emitted from the light source and a light receiving path of the light reflected from the object both pass through the PTPR element; and
   a window located between the light guide unit and the object, the same window being configured to pass the light reflected by the light guide unit to the object and pass the light reflected from the object to the light guide unit;
   wherein the light source and the sensing unit are located on a same substrate, and the light guide unit further includes a reflective optical element configured to reflect the light beam emitted by the light source to the PTPR optical element, whereby the light beam emitted by the light source is first reflected by the reflective optical element, next reflected by the PTPR optical element, and further next passing through the window.

2. The proximity sensing device of claim 1, wherein a size of the window is not larger than 1 mm×1 mm.

3. The proximity sensing device of claim 1, wherein the proximity sensing device is located in a handheld device, which includes a transparent cover for covering the proximity sensing device, wherein the transparent cover includes an IR-ink (infrared ink) located at a location corresponding to the window.

4. The proximity sensing device of claim 1, wherein the PTPR optical element includes a transparent body and a semi-reflective surface on the transparent body.

5. The proximity sensing device of claim 4, wherein the semi-reflective surface includes a polarization coating.

\* \* \* \* \*